(12) United States Patent  (10) Patent No.: US 7,430,637 B2
Mikami  (45) Date of Patent: Sep. 30, 2008

(54) STORAGE SYSTEM AND STORAGE CONTROL METHOD

(75) Inventor: Shogo Mikami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 11/129,619

(22) Filed: May 13, 2005

(65) Prior Publication Data

US 2006/0212667 A1  Sep. 21, 2006

(30) Foreign Application Priority Data

Mar. 18, 2005 (JP) ............................. 2005-078933

(51) Int. Cl.
  *G06F 12/00* (2006.01)
(52) U.S. Cl. ..................... 711/118; 711/165; 711/202
(58) Field of Classification Search .................. 711/118, 711/165, 202
See application file for complete search history.

(56) References Cited

U.S. PATENT DOCUMENTS 5,263,154 A  11/1993  Eastridge et al.
6,223,269 B1 *  4/2001  Blumenau ................... 711/202
2002/0178336 A1 *  11/2002  Fujimoto et al. ............ 711/165
2004/0114222 A1 *  6/2004  Katsumata ................... 359/380
2004/0261084 A1 *  12/2004  Rosenbloom et al. ....... 719/321

FOREIGN PATENT DOCUMENTS

JP  06-083677 A  3/1994

* cited by examiner

*Primary Examiner*—Gary J Portka
*Assistant Examiner*—Yong Jin Choe
(74) *Attorney, Agent, or Firm*—Townsend and Townsend and Crew LLP

(57) ABSTRACT

A storage system has a cache memory, a side-file being a storage area prepared in memory, and a copy source storage device. Each time write data is received, the storage system writes the write data to the copy source storage device via the cache memory, and also writes the received write data to the side-file. The storage system sends the plurality of write data accumulated in the side-file to another storage system at a certain timing. Thus, the plurality of write data stored in the copy source storage device is written to the copy destination storage device in the other storage system.

10 Claims, 8 Drawing Sheets

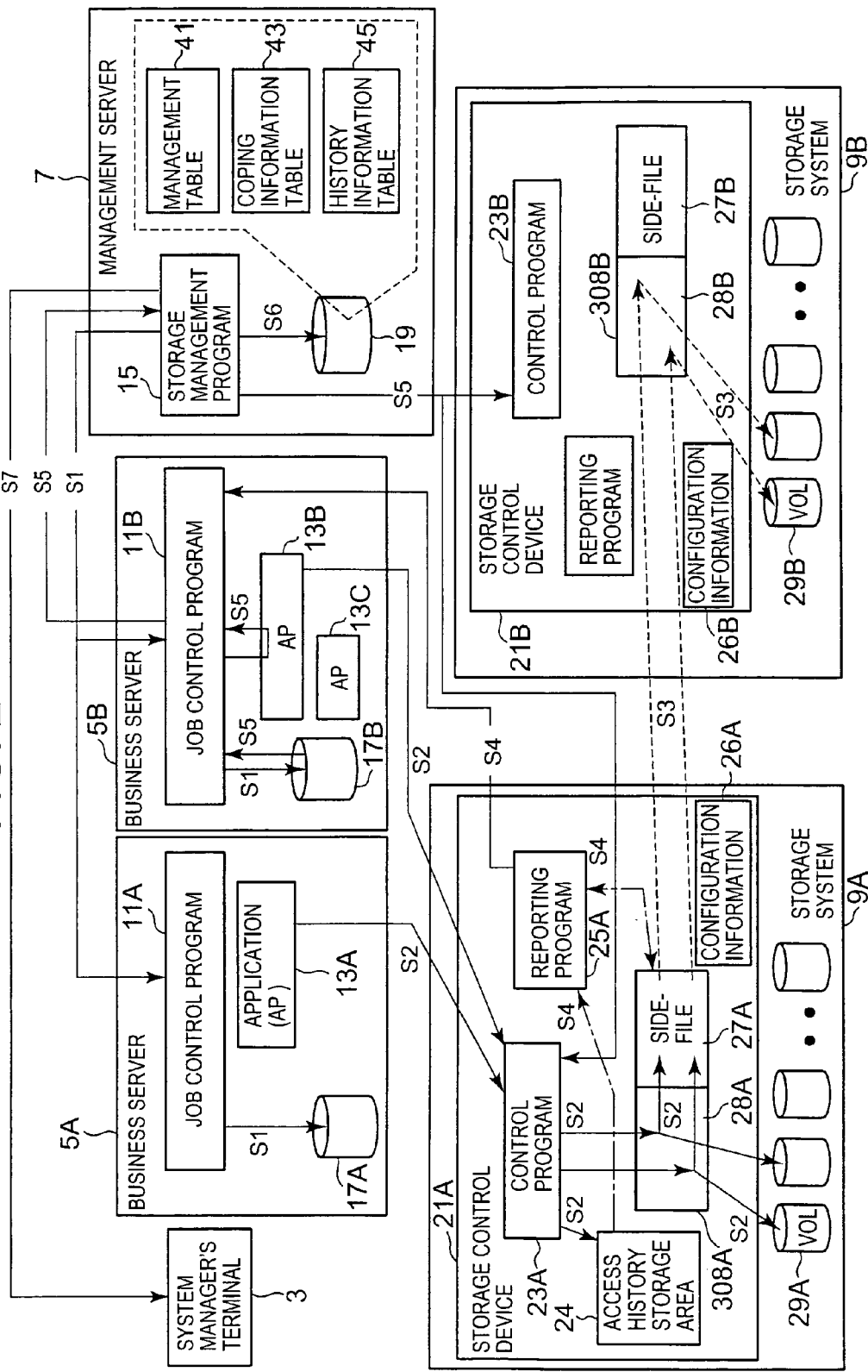

FIG. 3A

| APPLICATION ID | BUSINESS SERVER ID | VOLUME ID/STORAGE SYSTEM ID (PRIMARY VOLUME) | VOLUME ID/STORAGE SYSTEM ID (SECONDARY VOLUME) | COPY-PAIR STATUS |
|---|---|---|---|---|
| 13A | 5A | 001/9A | 001/9B | OPERATING |
| 13A | 5A | 002/9A | 002/9B | OPERATING |
| 13B | 5B | 003/9A | 003/9B | OPERATING |
| 13C | 5B | 004/9A | 004/9B | OPERATING |
| ⋮ | | | | |

| APPLICATION ID | SIDE-FILE USAGE THRESHOLD VALUE | COPING PROCESSING TO BE EXECUTED |
|---|---|---|
| 13A | — | NONE |
| 13B | 60% | HALT APPLICATION |
| 13C | 70% | HALT COPY-PAIR |
| ⋮ | | |

| HISTORICAL NUMBERS | COPING PROCESSING EXECUTED | EXECUTION TARGET FOR COPING PROCESSING | RESULTS OF EXECUTED COPING PROCESSING | TIME AT WHICH COPING PROCESSING WAS EXECUTED |
|---|---|---|---|---|
| 1 | HALT APPLICATION | APPLICATION 13B | NORMAL TERMINATION | 2005/01/24 19:00 |
| 2 | HALT COPY-PAIR | APPLICATION 13C | NORMAL TERMINATION | 2005/01/24 19:30 |
| 3 | FORCED HALT COPY-PAIR | APPLICATION 13A | NORMAL TERMINATION | 2005/01/24 20:00 |
| ⋮ | | | | |

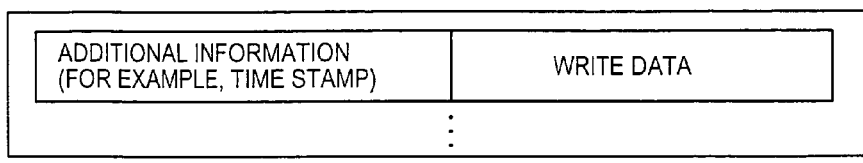

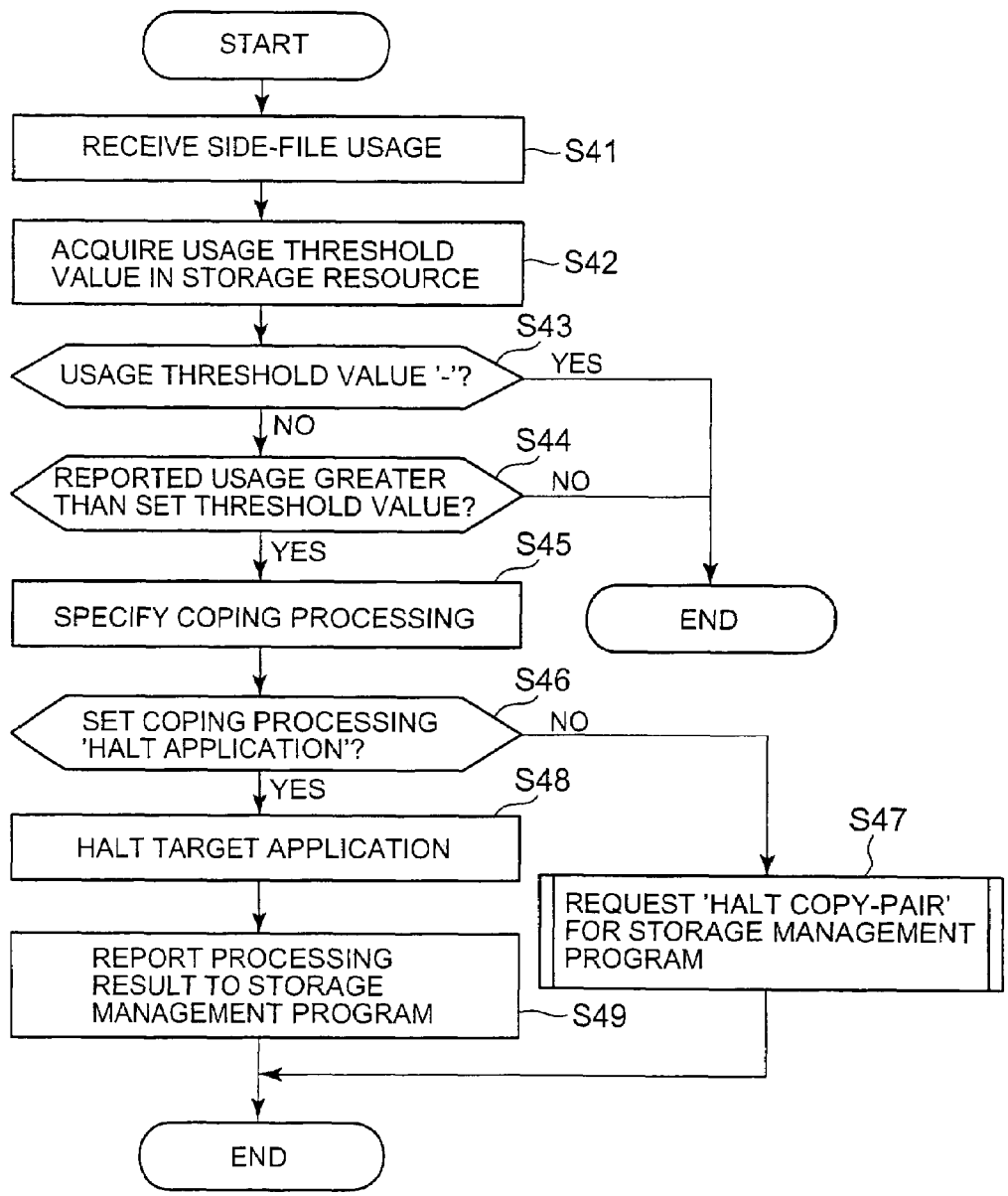

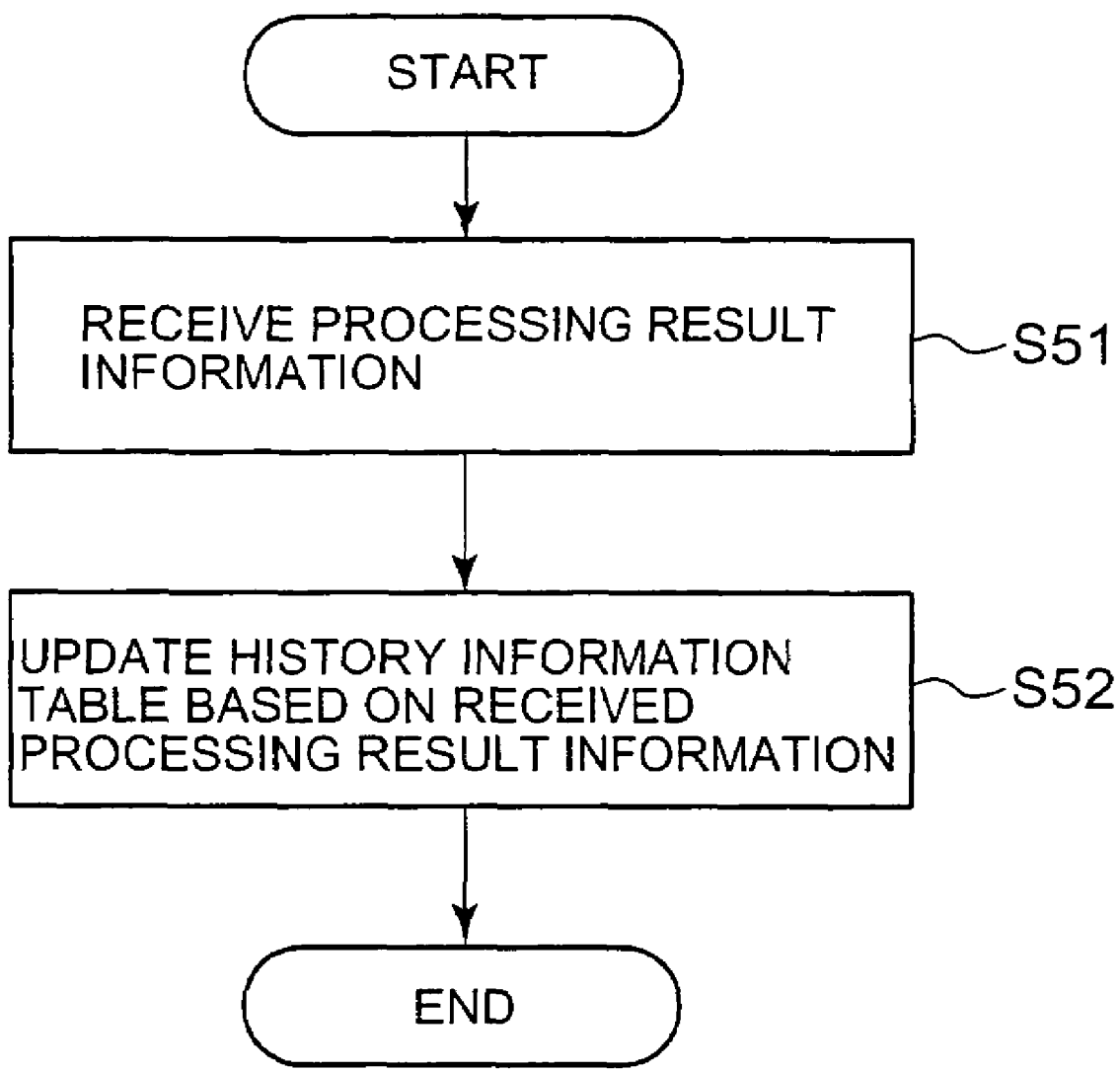

| BUSINESS SERVER ID | SIDE-FILE USAGE THRESHOLD VALUE | COPING PROCESSING TO BE EXECUTED |
|---|---|---|
| 5A | — | NONE |
| 5B | 60% | HALT APPLICATION |
| 5C | 70% | HALT COPY PAIR |
| ⋮ | | |

102

| BUSINESS SERVER ID | APPLICATION ID | SIDE-FILE USAGE THRESHOLD VALUE | PROCESSING TO BE EXECUTED |
|---|---|---|---|
| 5A | 13A | — | NONE |
| 5B | 13B | 50% | PROHIBIT WRITE REQUEST |
| 5B | 13B | 70% | HALT APPLICATION |
| 5B | 13C | 70% | HALT APPLICATION |
| ⋮ | | | |

103

STORAGE SYSTEM AND STORAGE CONTROL METHOD

CROSS-REFERENCE TO PRIOR APPLICATION

This application relates to and claims priority from Japanese Patent Application No. 2005-078933 filed on Mar. 18, 2005, the entire disclosure of which is incorporated herein by reference.

BACKGROUND OF THE INVENTION

Description of the Related Art

The present invention relates to data storage technology.

For example, a data copying method is disclosed in Japanese Patent Application Laid-open No. H6-83677. The copy source is a storage sub-system, this storage sub-system having a storage control mechanism 65 including a memory, and a storage device 61. The copy destination is another storage device outside the storage sub-system.

When a track in the storage device 61 is updated by an application 67 during a copying session, the storage sub-system transfers the data in that track prior to update to a memory in the storage control mechanism 65 as a side-file. The storage sub-system then copies the side-file (data prior to update) transferred to the memory to another storage device.

SUMMARY OF THE INVENTION

In the afore-mentioned data copying method, since it becomes necessary to read data from the storage device in order to transfer data from the storage device to the memory, it is possible that considerable time may be required to complete copying. Thus, it is desirable that data be copied with a method differing from the afore-mentioned method.

Therefore, an object of the present invention is to provide copying of data to another storage device with a method other than the method of reading data from the storage device to the memory.

Further objects of the present invention will become clear in the following description.

The storage system in accordance with the first aspect of the present invention has a request issuing source issuing access requests, and another storage system (for example, an external storage system), which can mutually communicate. The storage system has a controller, one or more memories including a cache memory, a side-file being a storage area in at least one of the memories, and a copy source storage device (for example, a physical or logical storage device). Each time the storage system receives write data and a write request from the request issuing source, the controller executes the processing (1) through (3), wherein (1) is processing for writing the received write data to the cache memory, (2) is processing for reading the write data from the cache memory, and writing this read write data to the copy source storage device, and (3) is processing for writing the write data written to the cache memory to the side-file. At a certain timing, the controller sends a plurality of write data accumulated in the side-file to the other storage system. Thus, the plurality of write data stored in the copy source storage device is written to the copy destination storage device.

In one embodiment, the side-file may be in the cache memory.

In one embodiment, the controller can check the condition of use of the side-file, and notify the request issuing source and/or the issuing source controller controlling the request issuing source of the checked condition of use.

Here, 'notify' is, for example, communicating the checked condition of use, or causing the condition of use registered in a prescribed location to be read to the request issuing source and/or the issuing source controller controlling the request issuing source.

In one embodiment, the controller can conduct a check of the condition of use of the side-file, and periodically notify the request issuing source and/or the issuing source controller of the checked condition of use.

In one embodiment, when the controller detects the occurrence of a prescribed event, the controller notifies the request issuing source and/or the issuing source controller of the checked condition of use.

In one embodiment, the controller can cease notifying the request issuing source and/or the issuing source controller of the checked condition of use when the controller detects that the prescribed event no longer occurs.

In one embodiment, the controller can set the checked condition of use in the response to the received access request, and return the response in which the condition of use is set to the request issuing source and/or the issuing source controller.

In one embodiment, the controller can notify the request issuing source issuing an access request being a write request rather than a read request and/or the issuing source controller of the checked condition of use.

In one embodiment, the request issuing source may be an application program issuing an access request. The storage system may be connected to a host device having application programs and a control program to control application programs, so that it can communicate with the host device. The controller can notify the control program of the checked condition of use.

In one embodiment, the controller can check the condition of use of the side-file, and control the request issuing source in accordance with the checked condition of use. In practice, for example, when the condition of use of the side-file has deteriorated (for example, little free space is available), the controller can induce the request issuing source to conduct processing to improve the condition of use (for example, not send write data to the storage system).

The system according to the second aspect of the present invention has a request issuing source issuing access requests, another storage system having a copy destination storage device, and a storage system connecting, and permitting communication between, the request issuing source and the other storage system. The storage system has a controller, one or more memories including a cache memory, a side-file being a storage area in at least one of the memories, and a copy source storage device. Each time the storage system receives write data and a write request from the request issuing source, the controller executes the processing (1) through (3), wherein (1) is processing for writing the received write data to the cache memory, (2) is processing for reading the write data from the cache memory, and writing this read write data to the copy source storage device, and (3) is processing for writing the write data written to the cache memory to the side-file. At least one of the storage system and the other storage system writes a plurality of write data accumulated in the side-file to the copy destination storage device.

In one embodiment, the controller can check the condition of use of the side-file, and notify the request issuing source and/or the issuing source controller of the checked condition of use. The request issuing source and/or the issuing source controller can execute processing in accordance with the checked condition of use.

In one embodiment, the issuing source controller can receive the checked condition of use, and control the request issuing source being the target of control of the issuing source controller based on this condition of use.

In one embodiment, the storage system may be communicably connected with the host device. The host device can have an application program being a request issuing source, a control program being the issuing source controller, and a storage resource. Coping information indicating which processing is to be executed for which application program under which condition of use may be stored in the storage resource. The control program can control the application program based on the received condition of use, and the coping information in the storage resource.

The device according to the third aspect of the present invention is a device able to communicate with the storage system. The storage system receives access requests from the request issuing source issuing access requests, and has a controller, one or more memories including a cache memory, a side-file being a storage area in at least one of the memories, and a copy source storage device. The access requests are read or write requests. Write data is also issued when the request issuing source issues a write request. Each time the storage system receives write data and a write request from the request issuing source, the controller executes the processing (1) through (3), wherein (1) is processing for writing the received write data to the cache memory, (2) is processing for reading the write data from the cache memory, and writing this read write data to the copy source storage device, and (3) is processing for writing the write data written to the cache memory to the side-file. A plurality of write data accumulated in the side-file is written to the copy destination storage device in the other storage system by at least one of the storage system and the other storage system. The controller checks the condition of use of the side-file, and notifies the device of the checked condition of use. The device executes processing for the request issuing source in accordance with the checked condition of use.

In the storage control method according to the fourth aspect of the present invention, the storage system receives a write request and write data from the request issuing source, and each time receiving the write request and the write data, executes the processing (1) through (3), wherein (1) is processing for writing the received write data to the cache memory in the storage system, (2) is processing for reading the write data from the cache memory, and writing this read write data to the copy source storage device in the storage system, and (3) is processing for writing the write data written to the cache memory to the side-file in one or more memories in the storage system, and at a certain timing, sends a plurality of write data accumulated in the side-file to another storage system, and writes the plurality of write data thus sent to the copy destination storage device in the other storage system.

At least one of the controller, the issuing source controller, and the device can be comprised of hardware, a computer program, or a combination of the three. The computer program is executed is loaded into the prescribed processor and executed. Furthermore, storage areas existing in the hardware resources such as memory and the like may be used appropriately in processing of information when the computer program is loaded into the prescribed processor.

BRIEF DESCRIPTION OF THE DRAWINGS

FIG. 2 is a block diagram describing the functions of the elements comprising the system related to one embodiment of the present invention;

FIG. 3A is an example of the configuration of the management table 41;

FIG. 3B is an example of the configuration of the coping information table 43;

FIG. 3C is an example of the configuration of the history information table 45;

FIG. 3D is a diagram describing an example of a method of storing data in the side-file 27A;

FIG. 5 shows an example of processing flow conducted by the job control program in step S5;

FIG. 6 shows an example of processing flow conducted by the storage management program 15 in step S6;

DESCRIPTION OF THE PREFERRED EMBODIMENTS

Figure 1:
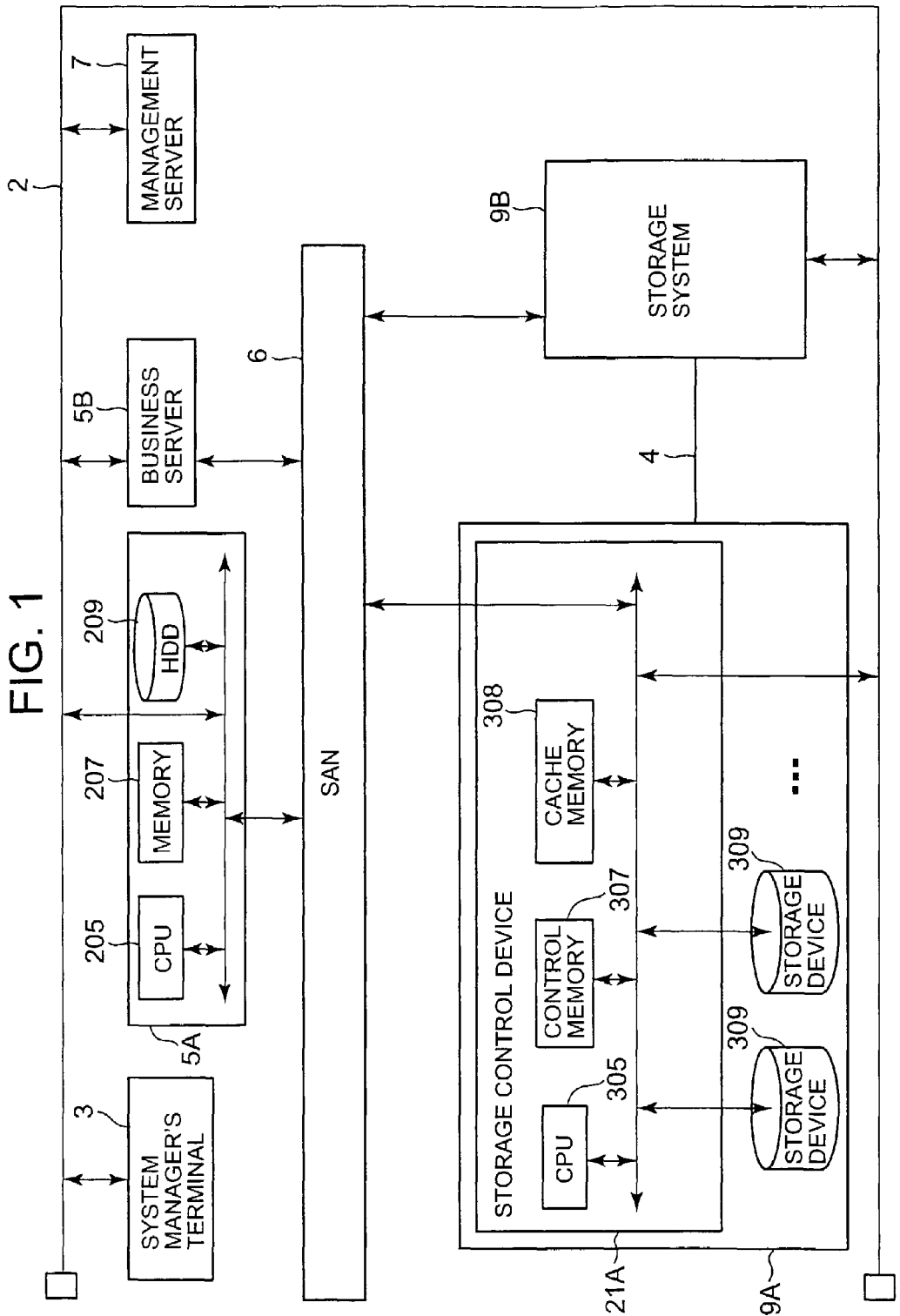
FIG. 1 is an outline of the configuration of the hardware of the system related to one embodiment of the present invention.

FIG. 1 is an outline of the configuration of the hardware of the system related to one embodiment of the present invention.

A system manager's terminal 3, one or a plurality (two for convenience in this description) of business servers 5A and 5B, a management server 7, and a plurality (two for convenience in this description) of storage systems 9A and 9B, are connected to a communications network 2 such as a LAN (Local Area Network). Each device 3, 5A, 5B, 7, 9A, and 9B may therefore communicate with other devices 3, 5A, 5B, 7, 9A, and 9B via the communications network 2. Furthermore, a plurality of business servers 5A and 5B, and a plurality of storage systems 9A and 9B, may be connected to a SAN (Storage Area Network) 6 (another communications network may be used in place of the SAN 6). Furthermore, the storage system 9A is connected to the other storage system 9B via a dedicated line (for example, a finer channel cable) 4 (the dedicated line 4 need not be present).

The system manager's terminal 3, the business servers 5A and 5B, and the management server 7 can employ the same configuration in practice. Thus, the business server 5A is employed as a representative example in the description. The business server 5A is, for example, a computer system having hardware resources such as one or more CPUs (Central Processing Unit) 205, storage resources (for example, one or more memories 207 and/or one or more hard disk drives (HDD) 209) and the like. The business server 5A can be, for example, a personal computer, a workstation, a server machine, or a mainframe and the like. Furthermore, the business server 5A can have, for example, information input devices (not shown in figures) such as keyboard switches and pointing device, and a microphone and the like, and for example, information output devices (not shown in figures) such as a monitor display and speaker and the like.

The storage systems 9A and 9B can employ the same configuration in practice. Thus, the storage system 9A is employed as a representative example in the description. The storage system 9A has a storage control device 21A, and one or a plurality of storage devices (for example, HDDs) 309. The storage control device 21A is a device controlling operation of the storage system 9A, and can have one or more CPUs 305, one or more control memories 307, and one or more cache memories 308. The control memory 307 is a memory storing information necessary for control of processing conducted by the storage system 9A (for example, configuration information 26A disclosed in FIG. 2). The cache memory 308 is a memory temporarily storing data passed between the business servers 5A and 5B and the storage device 309. The control memory 307 and the cache memory 308 need not be separate memories, and, for example, a method in which a control memory area and a cache memory area are prepared in the same memory may be employed. Furthermore, the plurality of storage devices may employ a RAID configuration.

For example, the storage system 9A can send data to the other storage system 9B via a dedicated line 4, a SAN 6, or a communications network 2 in the afore-mentioned hardware configuration.

Furthermore, for example, the business server 5A can issue an access request being a data write request or a data read request to the storage system 9A, and the storage system 9A receiving this access request can process this access request. In practice, for example, when the access request is a data write request, the CPU 305 of the storage system 9A can write the data from the business server 5A to the cache memory 308 in accordance with the write request, and read the data written to the cache memory 308 and write it to the storage device 309. Furthermore, for example, when the access request is a data read request, the CPU 305 in the storage system 9A can read the data from the storage device 309 in accordance with the read request and write the data to the cache memory 308, and read the data written to the cache memory 308 from the cache memory 308 and send it to the business server 5A being the issuing source of the read request.

FIG. 2 is a block diagram describing the functions of the elements comprising the system related to one embodiment of the present invention.

The system manager's terminal 3 is a terminal used by the manager of the system (hereafter referred to as the 'system manager') related to this embodiment. The system manager's terminal 3 can receive information sent from the storage management program 15, and display the received information on the display screen of the system manager's terminal 3. The information sent from the storage management program 15 includes, for example, operating information for application programs (hereafter referred to as 'AP') 13A, 13B, and 13C, copy-pair statuses written to the management table 41 (described below), and/or information written to the history information table 45.

Each business server 5A and 5B has, for example, a plurality of computer programs loaded into and running on the CPU 205. The plurality of computer programs include one or more APs and job control programs. In the present embodiment, the business server 5A has one AP 13A and a job control program 11A. The business server 5B has two APs 13B and 13C and a job control program 11B. The business server 5A is employed as a representative example in the description.

The AP 13A issues an access request to the storage system 9A (or 9B). Thus, data sent from the AP 13A is written to the logical volume 29A (or 29B) in the storage system 9A (or 9B), and data is read from the logical volume 29A (or 29B) and received by the AP 13A.

The job control program 11A is a program which can control the AP 13A running on the business server 5A (for example, start and/or halt the AP 13A). The job control program 11A may be an agent program of the storage management program 15, and can control AP 13A in accordance with instructions from the storage management program 15. Furthermore, the job control program 11A may be the operating system of the business server 5A.

The management server 7 is a server which can manage the business servers 5A and 5B, and the storage systems 9A and 9B. The storage resource 19 of the management server 7 can, for example, store the management table 41, the coping information table 43, and the history information table 45. Furthermore, the management server 7 has a storage management program 15.

Information for management of the business servers 5A and 5B and the storage systems 9A and 9B is written to the management table 41. In practice, for example, information indicating which application can access which logical volume (hereafter referred to as a 'VOL'), which two VOLs comprise a pair, and the status of the pair, is written to the management table 41. More practically, for example, as shown in FIG. 3A, the AP ID (for example, a name), the ID of the business server having the AP (for example, a name), the ID of the primary volume (hereafter referred to as the 'PVOL') which can be accessed by the AP (for example, a number), the ID of the storage system having the PVOL (in other words, the copy source VOL) (for example, a number), the ID of the secondary VOL (hereafter referred to as the 'SVOL') comprising a pair with the PVOL (for example, a number), the ID of the storage system having the SVOL (for example, a number), and the copy-pair status being the status of the pair, are written to the management table 41. The copy-pair status includes, for example, a status 'operating' in which data stored in the PVOL can be copied to the SVOL, and the status 'halted' in which data stored in the PVOL can not be copied to the SVOL.

The status of use (described below) of the side-file 27A, and coping processing details in accordance with this status, are written to the coping information table 43. In practice, for example, information indicating which AP is to execute which coping processing in which case of side-file usage is written to the coping information table 43. In practice, for example, as shown in FIG. 3B, the ID of the AP controlled with the job control program, the threshold value for usage of the side-file 27A (hereafter referred to as the 'usage threshold'), and details of coping processing executed in the AP by the job control program when actual usage of the side-file 27A exceeds the usage threshold, are written to the coping information table 43. In FIG. 3B, when '-' is set for the threshold value, processing is not executed irrespective of actual usage of the side-file 27A. The side-file is described below.

History related to coping processing executed by the management server 7 (for example, executed in the AP) is written to the history information table 45. In practice, for example, as shown in FIG. 3C, historical numbers identifying the history, coping processing executed by the management server 7, the target of execution of coping processing, the results of execution of coping processing, and the time at which coping processing was executed, are written to the history information table 45.

The storage management program 15 is a program which can control the overall system related to the present embodiment. The storage management program 15 can, for example, instruct control of the copy-pair (for example, set the status of the copy-pair to 'operating' or 'halted') for the storage systems 9A and 9B. Furthermore, the storage management program 15 can acquire the prescribed timing, or timing desired by the system manager (for example, regular or irregular), and the configuration information 26A and 26B for the storage systems 9A and 9B.

Since the storage systems 9A and 9B can employ the same configuration in practice, the storage system 9A is employed as a representative example in the description. The plurality of storage devices 309 of the storage system 9A have one or a plurality of VOLs 29A. When the VOL 29A comprises a pair with another VOL, it can become either the PVOL or the SVOL, however, it is assumed as the PVOL in the following description for purposes of simplicity (on the other hand, the VOL 29B in the storage system 9B is assumed as SVOL). The PVOL 29A can, for example, store data used by AP 13A, 13B, or 13C running on the business servers 5A or 5B.

Furthermore, a storage area being side-file 27A is prepared in the storage system 9A. The 'side-file' in this embodiment is a storage area used for asynchronous remote copying of data from business servers 5A and 5B to PVOL 29A. 'Asynchronous remote copying' is the copying of data written to PVOL 29A to SVOL 29B in the other storage system 9B (SVOL 29B comprising a pair with PVOL 29A) with timing differing from that with which data is written to the PVOL 29A. The side-file 27A is a storage area for temporarily storing data written to PVOL 29A. When N items of data (N being an integer equal to or greater than 1) are written to PVOL 29A, all N items are written to the side-file 27A. The side-file 27A may be prepared anywhere in the storage resource of the storage system 9A, however, in the present embodiment it is prepared in the cache memory 308. The cache memory 308 therefore includes an area 28A in which data passed between the business servers 5A and 5B and the PVOL 29A is temporarily stored (hereafter referred to as the 'main area'), and the side-file 27A. Data passed between the PVOL 29A and the business servers 5A and 5B is temporarily stored in the main area 28A, however, in the present embodiment the data written to the main area 28A is also written to the side-file 27A. When, for example, data written to the main area 28A is written to both the PVOL 29A and the side-file 27A, it may be deleted from the main area 28A, however, data written to the side-file 27A is not deleted at least until it is written to the SVOL 29B. Writing data to the side-file 27A, and remote copying from the side-file 27A to the other storage system 9B, is described below. Furthermore, in order to ensure that data is written to the SVOL 29B in the same sequence in which it is written to PVOL 29A, in remote copying, the control program 23A also sends information identifying the sequence in which data is written to the copy destination storage system 9B. This is described below.

Configuration information 26A is stored in the storage resource of the storage control device 21A (for example, the control memory 307 in FIG. 1). The storage control device 21A has a plurality of computer programs loaded into and running on the CPU 305. This plurality of computer programs includes, for example, the control program 23A and the reporting program 25A.

The configuration information 26A is information related to the internal configuration of the storage system 9A. In practice, for example, the configuration information 26A includes information indicating which two VOLs comprise a pair, and the status of the pair. More practically, for example, the configuration information 26A includes information other than application IDs and business server IDs from the management table 41 shown in FIG. 3A.

The control program 23A is a program (for example, an operating system) which can control operation of the storage control device 21A. In practice, for example, the control program 23A can receive an access request and control the passing of data via the cache memory 308A between the business servers 5A and 5B and the PVOL 29A based on the received access request. Furthermore, for example, the control program 23A can write data written to the PVOL 29A to the side-file 27A, and by referencing the configuration information 26A, identify which SVOL 29B corresponds to which PVOL 29A, and write data accumulated in the side-file 27A to the identified SVOL 29B in the other storage system 9B. Furthermore, for example, when the access request is received, the control program 23A can also write information related to the access request to a prescribed storage area (hereafter referred to as the 'access history storage area') 24. The access history storage area 24 contains, for example, the time at which the access request was received, the type of access request (for example, either a read request or a write request), and the ID (for example, WWN (World Wide Name)) of the issuing source of the access request (business server or AP), for each access request.

The reporting program 25A is a program which can report usage of the side-file 27A (hereafter referred to as 'side-file usage') to the business servers 5A and 5B. In practice, for example, the reporting program 25A can check side-file usage with primary timing, and report the checked side-file usage to the specified destination with secondary timing. 'Primary timing' can be, for example, at least one of (A) regular, (B) irregular, or (C) when the storage control device 21A receives a write request. Furthermore, 'secondary timing' can be, for example, at least one of (a) immediately after primary timing (for example, immediately after in practice), (b) when occurrence of a prescribed event is detected (for example, when side-file usage exceeds a prescribed value (for example, 50%)), or (c) when a response is returned for a write request received from the business servers 5A and 5B. When (b) is employed, for example, reporting may be event-driven as with SNMP (Simple Network Management Protocol) trap transmission. Furthermore, in this case, side-file usage can be reported while the prescribed timing is detected (for example, regular reporting), and if the prescribed event no longer occurs (for example, side-file usage becomes equal to or less than a prescribed value), reporting of side-file usage can be discontinued. In (c), the response may be, for example, returned immediately after receipt of a write request, or returned when data is written to the cache memory cache memory 308A in accordance with the write request. When the timing in (c) is employed, the reporting program 25A can embed the checked side-file usage in the response. Thus, the response in which side-file usage is embedded is returned to the business servers 5A and 5B (for example, AP 13A and/or job control program 11A). Side-file usage may be computed by computer programs such as the reporting program 25A or the control program 23A. The reporting program 25A can check the computed side-file usage. Furthermore, the 'specified destination' to which side-file usage is reported can be, for example, a business server, an application on a business server, or the job control program controlling the application. In practice, for example, the 'specified destination' can be an object expected to contribute to suppressing increased side-file usage (for example, an object expected to contribute to reducing side-file usage). In practice, for example, it can be the issuing source of the write request received when reporting side-file usage (or an object controlling the issuing source). More practically, for example, the reporting program 25A can compare the instant of the secondary timing and the instant at which the write request written to the access history storage area 24 is received, set the issuing source of the write request, or an object controlling the issuing source, for which the instant of the secondary timing or later is the instant of reception (for example, within a prescribed time after the instant of the secondary timing) as the specified destination, and report side-file usage to the issuing source (for example, an application or business server) or the object controlling the issuing source (for example, the job control program or management server).

The processing conducted by the system related to the present embodiment is described below in reference to FIG. 2.

For example, the AP 13A (for example, an AP conducting transaction operations) can be run on the business server 5A, and the AP 13A controlled with the job control program 11A. Furthermore, the AP 13B and 13C (for example, both being applications for batch processing) can be run on the business server 5B, and controlled with the job control program 11B. Furthermore, the management table 41, the coping information table 43, and the history information table 45 are prepared beforehand in the storage resource 19 of the management server 7. The storage management program 15 on the management server 7 can acquire the configuration information 26A and 26B in the storage systems 9A and 9B from the storage systems 9A and 9B with the prescribed timing (for example, regular timing), and update the management table 41 based on the configuration information 26A and 26B. Furthermore, checking side-file usage with the reporting program 25A is conducted regularly (in other words, with timing (A)), and reporting side-file usage is also conducted regularly (in other words, with timing (b)).

For example, processing in the following steps S1 through S7 is conducted under these conditions.

Step S1

The job control program 11A running on the business server 5A acquires the coping information related to the target AP from the storage management program 15 on the management server 7 with the prescribed timing (for example, when AP 13A is started), and writes the coping information to the storage resource 17A of the business server 5A. The job control program 11B on the business server 5B can also be executed. Here, to the job control program 11A, the 'target AP' is, for example, the AP controlled by the job control program 11A. The job control program 11A, can receive, for example, the coping information corresponding to the ID of the AP (for example, 'side-file usage threshold value', and 'coping processing to be executed') from the storage management program 15, and associate the received coping information with the ID of the AP and write it to the storage resource 17A.

Step S2

The AP 13A is employed as the representative example of the APs 13A, 13B, and 13C. The AP 13A issues write data and write requests (write requests include, for example, the ID of the PVOL 29A being the write destination of the write data) to the storage system 9A. The storage control device 21A of the storage system 9A receives write data and write requests. The control program 23A writes the fact that the received access requests is a write request, the time the write request is received, and the ID of the issuing source of the write request and the like, to the access history storage area 24. Furthermore, the control program 23A temporarily stores write data in the main area 28A of the cache memory 308A, and returns a response to AP 13A indicating that the write request has been actioned. Furthermore, the control program 23A reads write data stored in the main area 28A from the main area 28A and writes the write data to the PVOL 29A. Furthermore, the control program 23A also writes write data to the side-file 27A with the prescribed timing (for example, in practice, the same timing with which write data is written to the main area 28A, or after write data is written to the main area 28A). In this case, for example, since packet overrun occurs with remote copying, the control program 23A generates information to notify the copy destination storage system 9B of the sequence with which the plurality of data is written to PVOL 29A. In practice, for example, as shown in FIG. 3D, each time write data is written to the side-file 27A, the control program 23A adds additional information including a time stamp to the write data and writes the write data including the additional information to the side-file 27A. The time stamp included in the additional information can, for example, be the reception time of the write data and write request, or the time at which write data is written to the cache memory 308A. Furthermore, the additional information can also include the ID of the copy destination (the storage system and SVOL ID which can be identified by the control program 23A referencing the configuration information 26A) corresponding to the ID of the PVOL 29A being the write destination of the write data added to the additional information.

Step S3

All write data received by the storage control device 21A, for example, between conducting at least the Mth (M being an integer equal to or greater than zero) remote copy and conducting the M+1th remote copy, is accumulated in the side-file 27A. Furthermore, additional information including a time stamp is added to each write data. The control program 23A transfers all write data and additional information stored in the side-file 27A to the other storage system 9B in the M+1th remote copy. In this case, if a plurality of other storage systems exist, which set of write data and additional information is sent to which storage system may be determined from, for example, the prescribed information elements (for example, the storage system being the copy destination, and the SVOL ID) included in the additional information. The storage control device 21B of the other storage system 9B receives a plurality of data sets of write data and additional information. The control program 23B in the storage control device 21B writes the plurality of write data in the received plurality of data sets to the main area 28B of the cache memory. The control program 23B stores the plurality of write data written to the main area 28B in the SVOL 29B in an order determined from the plurality of time stamps in the plurality of data sets. Which write data is stored in which SVOL 29B can be determined from, for example, the prescribed information elements (for example, the ID of the SVOL 29B being the copy destination) included in the additional information.

Step S4

The reporting program 25A regularly checks side-file usage and reports the checked side-file usage to a specific destination. Here, for example, the reporting program 25A references the access history storage area 24 and specifies the AP 13B as the issuing source of the write request received at or after the time side-file usage is reported, and reports side-file usage to the job control program 11B controlling the specified AP 13B. When side-file usage is reported to the job control program 11B, for example, the prescribed storage area in which information indicating the correspondence between the AP or business server ID and the job control program ID is referenced, and thus the job control program controlling the issuing source AP (in other words, reporting destination of the job control program) can be identified.

Step S5

The job control program 11B of the business server 5B receives the side-file usage report. For example, the set of information indicating the side-file usage value and details of corresponding coping processing is written to the storage resource 17B of the business server 5B. The job control program 11B compares the reported side-file usage and the usage threshold value stored in the storage resource 17B. If the comparison shows that side-file usage exceeds the usage threshold value, the job control program 11B executes the coping processing corresponding to the usage threshold value. In practice, for example, when there is a coping information table 43 as shown in FIG. 3B, the side-file usage threshold value of '60%', and the coping processing 'halt application' to be executed, are recorded for AP 13B (AP having ID '13B'), and the side-file usage threshold value of '70%', and the coping processing 'halt copy-pair' to be executed, are recorded for AP 13C, in the storage resource 17B with the processing in step S1. Here, when side-file usage exceeds 60% and is equal to or less than 70%, since side-file usage is evaluated as exceeding the usage threshold value of '60%' as a result of the comparison, the job control program 11B halts the AP 13B. When the job control program 11B executes coping processing, the processing result information in relation to the executed coping processing (for example, which coping processing is executed for which AP, and whether or not the coping processing was completed successfully), is reported to the storage management program 15. When the reported side-file usage exceeds 70%, since side-file usage is also evaluated as exceeding the usage threshold value of '70%' as a result of the comparison, the job control program 11B can halt the AP 13B, and for example, identify the pair associated with the AP 13C from the management table 41, and request that the copy-pair status for the pair be set to 'halted'. For example, the job control program 11B can request the management server 7, and the storage systems 9A and 9B. When the management server 7 is requested to halt the copy-pair, the management server 7 can request the storage systems 9A and 9B to halt the copy-pair. When 'halt copy-pair' is requested, for example, the copy-pair status of the pair may be set to 'halted' by the storage system 9A, and the result is reflected in the management table 41 of the management server 7 with the prescribed timing.

Step S6

The storage management program 15 receives the processing result information, and writes the information elements included in the received processing result information to the history information table 45.

Step S7

The storage management program 15 of the management server 7 sends all or part of the information written to the storage resource 19 to the system manager's terminal 3. The sent information is, for example, the management table 41, the coping information table 43, or the history information table 45. The sent information is displayed on the display screen of the system manager's terminal 3.

As described above, the storage system 9A can check side-file usage, and report the checked side-file usage to a specific destination (for example, at least one of business servers 5A and 5B, APs 13A, 13B, and 13C, job control programs 11A and 11B, and the management server 7). In this case, the storage system 9A may select the destination from among a plurality of candidate destinations in accordance with a specific condition (for example, in accordance with the checked side-file usage value, or in accordance with the timing of reporting of side-file usage or checking and the timing with which a write request is received). At the destination side, control to determine whether or not the prescribed coping processing is to be executed can be conducted based on whether or not the reported side-file usage exceeds the usage threshold value.

The processing described above is described in detail below.

Figure 4A:
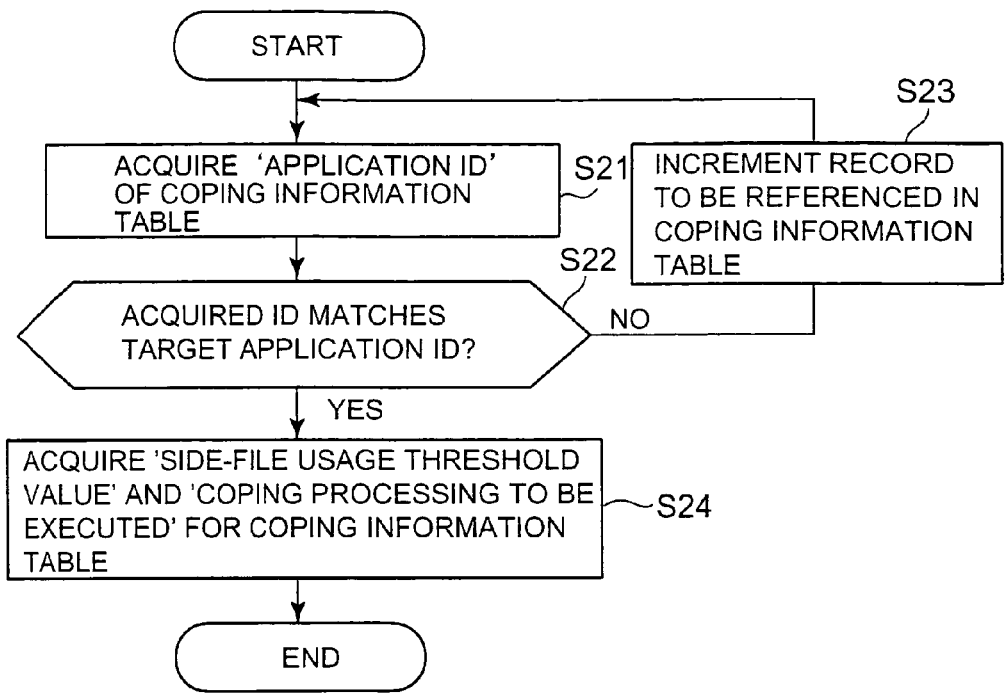
FIG. 4A shows an example of processing flow conducted by the job control program in step S1.

FIG. 4A shows an example of processing flow conducted by the job control program in step S1.

The job control program 11A is described using a representative example. The job control program 11A acquires the application ID from a record (line) in the coping information table 43 via the storage management program 15 of the management server 7 (S21).

The job control program 11A evaluates whether or not the acquired application ID matches the AP ID the job control program 11A controls (S22). If a match is not obtained (NO in S22), the job control program 11A references the next record (S23) and returns to S21. If a match is obtained (YES in S22), it acquires the 'side-file usage threshold value', and 'coping processing to be executed') corresponding to the application ID (S24). The job control program 11A can associate the 'side-file usage threshold value', and 'coping processing to be executed') with the corresponding application ID and write the ID to the storage resource 17A.

Figure 4B:
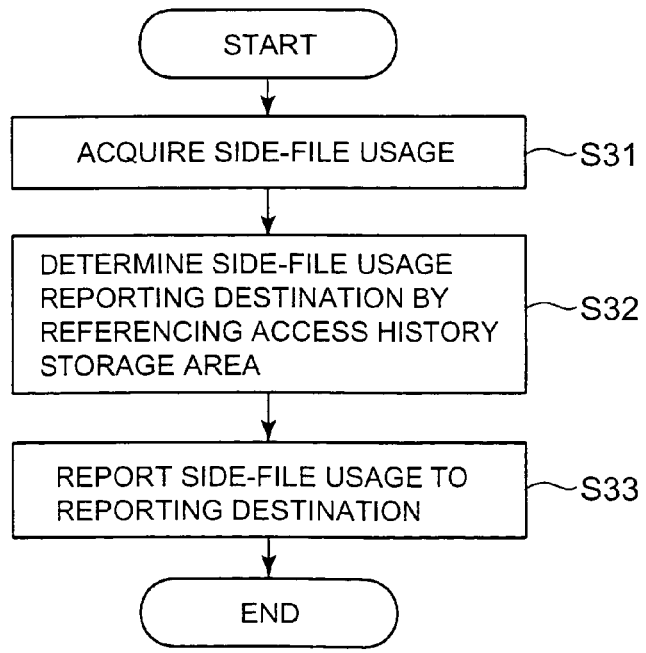
FIG. 4B shows an example of processing flow conducted by the reporting program in step S4.

FIG. 4B shows an example of processing flow conducted by the reporting program in step S4.

When the time to check side-file usage is reached, the reporting program 25A checks side-file usage (S31). In this case, for example, the control program 23A computes side-file usage and writes the computed result to the prescribed storage area, and the reporting program 25A may acquire the computed side-file usage from the prescribed storage area.

By referencing the access history storage area 24, the reporting program 25A determines the side-file usage report destination (S32). In practice, for example, the reporting program 25A may set the job control program controlling the issuing source AP of the write request received at or after the current time as the report destination, or may set the job control program controlling the issuing source AP of the write request during the current processing (in other words, while write data is being written to PVOL 29A) as the report destination.

The reporting program 25A reports side-file usage to the set report destination (S33).

FIG. 5 shows an example of processing flow conducted by the job control program in step 5. This processing flow is an example of two types of coping processing ('halt application' and 'halt copy-pair') associated with a side-file usage threshold value not set to '-'.

The job control program 11B is described using a representative example. The job control program 11B acquires the side-file usage threshold value (S42) in the storage resource 17B when side-file usage is received (S41).

Next, if the side-file usage threshold value is '-' (YES in S43) the job control program 11B terminates processing. If the side-file usage threshold value is not '-', (NO in S43), the job control program 11B evaluates whether or not side-file usage is greater than the usage threshold value (S44).

If the evaluation result in S44 is negative (NO in S44), the job control program 11B terminates processing. If the evaluation result in S44 is not negative (YES in S44), it specifies coping processing corresponding to the usage threshold value (S45).

If the specified coping processing is 'halt application' (YES in S46), the job control program 11B halts the AP 13B corresponding to the coping processing (S48), and reports the processing result information related to the processing result of the coping processing to the storage management program 15 (S49). On the other hand, if the specified coping processing is 'halt copy-pair', the job control program 11B requests the storage management program 15 for 'halt copy-pair' (S47). In this case, the storage management program 15 requests the storage systems 9A and 9B for 'halt copy-pair'.

FIG. 6 shows an example of processing flow conducted by the storage management program 15 in step S6.

The storage management program 15 receives processing result information from the job control program 11B (S51), and updates the history information table 45 (S52) based on the received processing result information. In practice, for example, the received processing result information includes 'executed coping processing', 'target of coping processing', 'execution result of coping processing', and 'time of execution of coping processing' being record elements of each record of the history information table 45. The storage management program 15 writes these record elements 'executed coping processing', 'target of coping processing', 'execution result of coping processing', and 'time of execution of coping processing' to the history information table 45.

Figure 7:
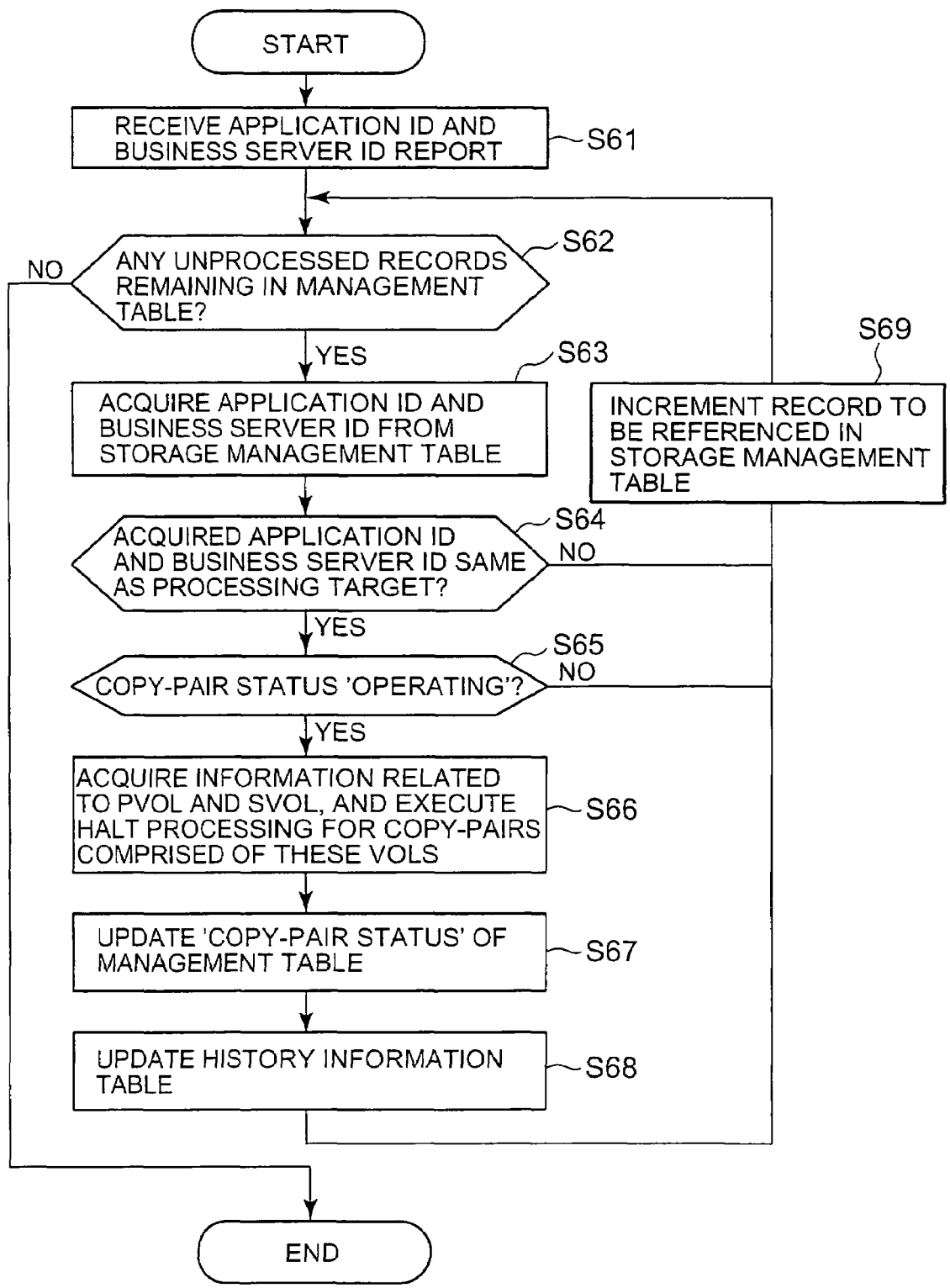
FIG. 7 shows an example of processing flow conducted in S47 in FIG. 5.

FIG. 7 shows an example of processing flow conducted in S47 in FIG. 5.

When the storage management program 15 receives a copy-pair request, the ID of the AP being the target, and the ID of the business server 5B having the job control program 11B, are received from the job control program 11B being the source of this request (S61).

The storage management program 15 acquires the application ID and the business server ID from a record of the management table 41 (YES in S62, S63). If the acquired application ID and the business server ID are the same as the acquired application ID and the business server ID received in S61 (YES in S64), and the copy-pair status of the target corresponding to these IDs is 'operating' (YES in S65), the storage management program 15 conducts processing in S66. In other words, the storage management program 15 acquires the information related to the PVOL and SVOL corresponding to the target copy-pair status (storage system and VOL ID), and executes 'halt copy-pair' processing for the copy-pair comprised of these VOLs (S66). In practice, for example, the storage management program 15 requests the storage system 9A and/or storage system 9B for halt the copy-pair.

Furthermore, the storage management program 15 updates the copy-pair status of the management table (the copy-pair status corresponding to the halt request) from 'operating' to 'halted' (S67). This processing can, for example, be conducted when the 'halt copy-pair' completion report is received from the 'halt copy-pair' request destination of storage systems 9A and/or 9B.

Following S67, the storage management program 15 updates the history information table 45 (S68). For example, the storage management program 15 can set 'executed coping processing' to 'halt copy-pair', 'target of coping processing' to the application ID for which a match was obtained in S64, 'execution result of coping processing' to 'normal termination', 'time of execution of coping processing' to the time the 'halt copy-pair' request was issued, and update the history information table 45.

According to the afore-mentioned embodiment, write data written to the PVOL 29A is written to the side-file 27A prepared in the cache memory 308A, and when asynchronous remote copying is conducted, write data is read from the side-file 27A rather than from the PVOL 29A, and the read write data is written to the SVOL 29B corresponding to the PVOL 29A. Thus, since there is no need to read data from the PVOL 29A with remote copying, the time between commencing and terminating remote copying is reduced.

Furthermore, according to the afore-mentioned embodiment, side-file usage is actively reported for the business servers 5A and 5B from the storage systems 9A and 9B. Thus, for example, when side-file usage increases dramatically in a short time, it can be expected that this fact will be detected by the business servers 5A and 5B without application of a large load on business servers 5A and 5B.

Furthermore, according to the afore-mentioned embodiment, in each business server 5A and 5B, processing is conducted based on side-file usage reported from the storage systems 9A and 9B, the usage threshold value set in the storage resources 17A and 17B of the business servers 5A and 5B, and the coping processing to be executed. Thus, for example, implementation of optimum measures on each business server can be expected in accordance with business characteristics (for example, batch processing or transaction processing), and operational policy.

Incidentally, a number of variations are possible in the afore-mentioned embodiment. Examples of these variations are described below. In the following description, differences with the afore-mentioned embodiments are primarily described, and common points are omitted or simplified.

(1) First Variation

Figures 8A, 8B, 8C:
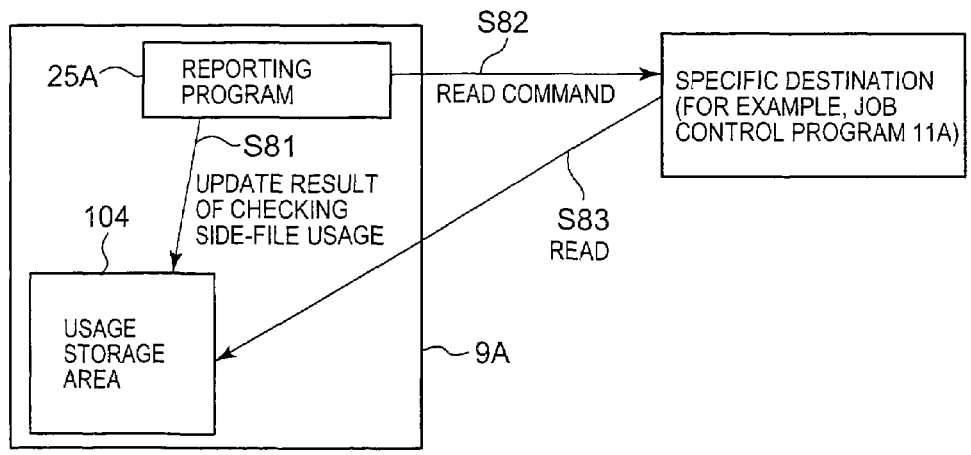
FIG. 8A shows an example of the configuration of the coping information table in the first variation of one embodiment of the present invention.
FIG. 8B shows an example of the configuration of the coping information table in the second variation of one embodiment of the present invention.
FIG. 8C is a diagram describing the processing in the third variation of one embodiment of the present invention.

FIG. 8A shows an example of the configuration of the coping information table in the first variation of one embodiment of the present invention. The business server ID is described in this coping information table 102 in place of the application ID. Thus, the execution target of coping processing in accordance with side-file usage is the business server rather than the AP. Therefore, for example, when the received side-file usage exceeds the usage threshold value of '60%', the business server 5B (for example, the operating system of the business server 5B) halts all application programs running on itself.

(2) Second Variation

FIG. 8B shows an example of the configuration of the coping information table in the second variation of one embodiment of the present invention. An application ID is described in this coping information table 103 for each business server ID. Thus, for example, even if the same type of AP exists on the same business server, differing usage threshold values and differing coping processing can be set for the same type of AP, and differing coping processing can be executed for the same type of AP in accordance with side-file usage. In practice, for example, when side-file usage reported to the business server 5B exceeds a usage threshold value of '50%', processing causing a write request not to be sent to the AP 13A in the business server 5B, and furthermore, to halt the application when side-file usage increases and the reported side-file usage exceeds a usage threshold value of '70%', is possible.

(3) Third Variation

FIG. 8C is a diagram describing the processing in the third variation of one embodiment of the present invention. In other words, the reporting program 25A writes the checked side-file usage to the usage storage area usage storage area 104 (S81), and issues a command to read the side-file usage from the usage storage area 104 to a specific destination (for example, the job control program 11A) (S82). The read command issued in S82 includes, for example, an access path name to the side-file usage to be read. In this case, the specific destination can read side-file usage from the usage storage area 104 in accordance with the read command (S83). The 'specific destination' may be, for example, the same as the afore-mentioned specific destination determined as the side-file usage report destination.

(4) Fourth Variation

In the fourth example of one embodiment of the present invention, the business servers 5A, 5B, . . . do not hold part of the management table 41 and coping information table 43, and the management server 7 receives the side-file usage report from the storage system 9A, and can control which type of coping processing is to be executed for which business server 5A and/or which AP in accordance with the reported side-file usage and each usage threshold value.

In practice, for example, the storage system 9A reports side-file usage to at least the management server 7. The storage management program 15 of the management server 7 compares the reported side-file usage and each usage threshold value recorded in the coping information table 43. When side-file usage exceeds a certain usage threshold value, the storage management program 15 identifies the coping processing and application ID corresponding to the usage threshold value from the coping information table 43, identifies the business server having the AP with the application ID from the management table 41, and reports the identified coping processing to the identified business server.

According to the fourth variation, even if a job control program having special functions (for example, comparison of side-file usage and usage threshold value, referencing tables to identify coping processing) is not mounted on each business server, the appropriate coping processing can be executed in the appropriate application and/or business server in accordance with side-file usage.

(5) Fifth Variation

In the fifth variation of one embodiment of the present invention, the management table 41 and the coping information table 43 are held in the storage control device 21A, and the storage control device 21A can control which type of coping processing is to be executed for which business server 5A and/or which AP in accordance with the reported side-file usage and each usage threshold value.

In practice, for example, the storage control device 21A compares side-file usage and each usage threshold value recorded in the coping information table 43. When side-file usage exceeds a certain usage threshold value, the storage control device 21A identifies the coping processing and application ID corresponding to the usage threshold value from the coping information table 43, identifies the business server having the AP with the application ID from the management table 41, and reports the identified coping processing to the identified business server.

In this fifth variation as well, even if a job control program having special functions (for example, comparison of side-file usage and usage threshold value, referencing tables to identify coping processing) is not mounted on each business server, the appropriate coping processing can be executed in the appropriate application and/or business server in accordance with side-file usage.

Ideal embodiments and a number of variations have been described above, however such embodiments and variations are examples for the purpose of describing the present invention, and the scope of the present invention is not limited to these embodiments and variations. The present invention may be implemented in a variety of other forms.

For example, the method for informing the storage system 9B being the copy destination of the sequence with which a plurality of write data is written to the PVOL 29A is not limited to the method of adding a time stamp to write data. For example, the control program 23A generates data (hereafter referred to as 'write order data') indicating the write order of a plurality of write data accumulated in the side-file 27A, and this write order data is sent to the storage system 9B being the copy destination of the plurality of write data to inform the storage system 9B of the write order of the plurality of write data from the write order data.

Furthermore, for example, the storage control device 21A reads data from the side-file 27A for asynchronous remote copying, and after transferring this data to the other storage system 9B, can delete transferred data from the side-file 27A with the prescribed timing (for example, immediately after transfer, or when the prescribed completion report is received from the storage system 9B).

Furthermore, for example, the reporting program 25A can accumulate the results of a plurality checks of side-file usage (for example, checked side-file usage values, and times of checks) in the prescribed storage area. Furthermore, for example, if the prescribed storage area is full, for example, the reporting program 25A can delete the oldest check result and write the newest check result. Furthermore, the reporting program 25A can report the plurality of check results stored in the prescribed storage area to the management server 7. The management server 7 may send the reported plurality of check results to the system manager's terminal 3, and may send these results to the job control programs 11A and 11B.

Furthermore, for example, when free-space in the side-file 27A is detected in the storage control device 21A as being below the usage threshold value based on side-file usage (for example, when very little free-space remains in the side-file 27A), the storage control device 21A can execute special coping processing. For example, the storage control device 21A may conduct processing to increase free-space in the side-file 27A by moving write data awaiting transfer in the side-file 27A from the side-file 27A to a logical volume, and may issue commands to each job control program to halt each AP.

Furthermore, in the afore-mentioned embodiments and variations, 'usage' is employed as an example of the status of use of the side-file 27A, however, naturally, the status of use is not limited to usage. For example, the total volume of data stored in the side-file 27A, or free-space in the side-file 27A, may be used.

Furthermore, for example, remote copying of the plurality of write data accumulated in the side-file 27A may be conducted, for example, by the storage system 9A issuing a write request to the storage system 9B, by the storage system 9B issuing a read request to the storage system 9B, or by the storage system 9B reading data directly from the side-file 27A.

Furthermore, for example, the plurality of usage threshold values assigned to the plurality of IDs (for example, application IDs and/or business server IDs) may be stored in the storage system 9A. In this case, the reporting program 25A compares the checked side-file usage and each usage threshold value, and when a usage threshold value less than the side-file usage is found, the checked side-file usage may be reported to the object having the ID corresponding to that usage threshold value.

What is claimed is:

1. A storage system which can be communicably connected with both a source business server issuing access requests and another storage system having a copy destination storage device, the storage system comprising:
- a controller; one or more memories including a cache memory; a side-file being a storage area prepared in at least one of one or more of the memories; and
- a copy source storage device; wherein each time the storage system receives write data and a write request from the business server, the controller executes the processing (1) through (3) of:
  (1) writing the received write data to the cache memory,
  (2) reading the write data from the cache memory, and writing the write data thus read to the copy source storage device, and
  (3) writing the write data written to the cache memory and additional information to the side-file, the additional information including information for notifying the another storage system of a sequence in which the write data was written to the copy source storage device;
- wherein the controller sends a plurality of write data accumulated in the side-file to the another storage system at a certain timing, and thus the plurality of write data stored in the copy source storage device is written to the copy destination storage device;
- wherein the controller checks a condition of use of the side file and notifies a job control program running on the business server of the checked condition of use, the job control program being configured to control operation of a plurality of business application programs running on the business server;
- wherein coping information for each business application program in the plurality of business application programs is stored in a storage resource of the business server, the coping information identifying processing to be performed for said each business application program under a particular condition of use; and
- wherein the job control program acquires the checked condition of use and controls each business application program in the plurality of business application programs based on the coping information and the checked condition of use.

2. The storage system according to claim 1 wherein the side-file is prepared in the cache memory.

3. The storage system according to claim 1 wherein the controller conducts a check of the condition of use of the side-file, and periodically notifies the job control program running on the business server of the checked condition of use.

4. The storage system according to claim 1 wherein when detecting the occurrence of a prescribed event, the controller notifies the job control program running on the business server of the checked condition of use.

5. The storage system according to claim 4 wherein the controller ceases notifying the job control program of the checked condition of use when detecting that the prescribed event no longer occurs.

6. The storage system according to claim 1 wherein the controller sets the checked condition of use in the response to the received access request, and returns the response in which the condition of use is set to the job control program.

7. A system comprising:
- a business server issuing access requests, the business server being configured to run a plurality of business application programs and at least one job control program for controlling execution of the plurality of business application programs; and
- a storage system communicably connected with both the business server and another storage system, said another storage system having a copy destination storage device, the storage system comprising:
  a controller;
  one or more memories including a cache memory;
  a side-file being a storage area prepared in at least one of one or more of the memories; and
  a copy source storage device;
- wherein each time the storage system receives write data and a write request from the business server, the controller executes the processing (1) through (3) of:
  (1) writing the received write data to the cache memory, (2) reading the write data from the cache memory, and writing the write data thus read to the copy source storage device, and (3) writing the write data written to the cache memory and additional information to the side-file, the additional information including information for notifying the another storage system of a sequence in which the write data was written to the copy source storage device;
- wherein at least one of the storage system and the another storage system writes the plurality of write data accumulated in the side-file to the copy destination storage device;
- wherein the controller checks a condition of use of the side file and notifies the job control program running on the business server of the checked condition of use;
- wherein coping information for each business application program in the plurality of business application programs is stored in a storage resource of the business server, the coping information identifying processing to be performed for said each business application program under a particular condition of use; and
- wherein the job control program acquires the checked condition of use and controls each business application program in the plurality of business application programs based on the coping information and the checked condition of use.

8. The system according to claim 7 wherein the side-file is prepared in the cache memory.

9. A host device communicatively coupled with a storage system, the host device comprising:
- a processor configured to execute an application program and a job control program, wherein the job control program is configured to control operation of the application program, and wherein the application program issues write requests and write data; and
- a storage resource;
- wherein the storage system is configured to receive a write request and write data from the application program, and wherein the storage system comprises:
  a controller;
  one or more memories including a cache memory;
  a side-file being a storage area prepared in at least one of one or more of the memories; and
  a copy source storage device;
- wherein the storage system is communicatively coupled with another storage system having a copy destination storage device;
- wherein each time the storage system receives write data and a write request from the application program, the controller executes the processing (1) through (3) of:
  (1) writing the received write data to the cache memory, (2) reading the write data from the cache memory, and writing the write data thus read to the copy source storage device, and (3) writing the write data written to the cache memory and additional information to the side-file, the additional information including information for notifying the another storage system of a sequence in which the write data was written to the copy source storage device;

wherein at least one of the storage system and the another storage system writes the plurality of write data accumulated in the side-file to the copy destination storage device;

wherein the controller checks a condition of use of the side-file and notifies the job control program running on the host device of the checked condition of use;

wherein coping information for the application program is stored in the storage resource of the host device, the coping information identifying processing to be performed for the application program under a particular condition of use; and wherein the job control program acquires the checked condition of use and controls the application program based on the checked condition of use and the coping information.

10. A storage control method for a storage system comprising the steps of:

receiving write data and a write request from a business server configured to run a plurality of business application programs and at least one job control program for controlling execution of the plurality of business application programs;

executing the processing (1) through (3) of:

(1) writing the received write data to a cache memory in the storage system, (2) reading the write data from the cache memory, and writing the write data thus read to a copy source storage device in the storage system, and (3) writing the write data written to the cache memory and additional information to a side-file being a storage area prepared in one or more memories in the storage system, the additional information including information for notifying another storage system of a sequence in which the write data was written to the copy source storage device;

sending a plurality of write data accumulated in the side-file to a copy destination device in the another storage system at a certain timing; and writing the plurality of write data thus sent to the copy destination device in the other storage system based on the additional information;

wherein the controller checks a condition of use of the side file and notifies the job control program running on the business server of the checked condition of use;

wherein coping information for each business application program in the plurality of business application programs is stored in a storage resource of the business server, the coping information identifying processing to be performed for said each business application program under a particular condition of use; and wherein the job control program acquires the checked condition of use and controls each business application program in the plurality of business application programs based on the coping information and the checked condition of use.

* * * * *